(12) United States Patent
Torii (10) Patent No.: US 8,801,075 B2
(45) Date of Patent: Aug. 12, 2014

(54) VEHICLE DOOR TRIM

(71) Applicant: Nobuyuki Torii, Nagoya (JP)

(72) Inventor: Nobuyuki Torii, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/738,369

(22) Filed: Jan. 10, 2013

(65) Prior Publication Data

US 2013/0181475 A1    Jul. 18, 2013

(30) Foreign Application Priority Data

Jan. 12, 2012 (JP) ................................. 2012-004127

(51) Int. Cl.
 *B60J 5/04* (2006.01)
(52) U.S. Cl.
 USPC ......................................... 296/146.7; 29/428
(58) Field of Classification Search
 USPC ........ 296/187.05, 187.12, 146.7, 146.1, 1.08, 296/187.03, 39.1, 146.9; 49/502; 29/428
 IPC .................................... B60J 5/04; B60R 13/02
 See application file for complete search history.

(56) References Cited

U.S. PATENT DOCUMENTS 5,169,204 A * 12/1992 Kelman ..................... 296/146.7
6,126,230 A * 10/2000 Ikeda et al. ............... 296/187.05
6,149,224 A * 11/2000 Tiberia et al. .............. 296/146.7
7,077,449 B2 * 7/2006 Tokunaga .................... 296/39.1
7,445,270 B2 * 11/2008 Wakou et al. ............. 296/187.05
7,677,640 B2 * 3/2010 Dix et al. .................... 296/146.7
7,726,726 B2 * 6/2010 Cavallin et al. .......... 296/187.05
8,020,921 B2 * 9/2011 Moberg ..................... 296/146.7
8,215,699 B2 * 7/2012 Suzuki et al. .............. 296/146.7

FOREIGN PATENT DOCUMENTS

| JP | 2008120128 A | 5/2008 |
| JP | 2009173197 A | 8/2009 |
| JP | 2011126489 A | 6/2011 |

* cited by examiner

*Primary Examiner* — Glenn Dayoan
*Assistant Examiner* — Pinel Romain
(74) *Attorney, Agent, or Firm* — Gifford, Krass, Sprinkle, Anderson & Citkowski, P.C.

(57) ABSTRACT

A door trim for a vehicle includes: a trim main body formed so as to be bulging out inward of a vehicle compartment as an interior furnishing material of a door inner panel of a side door; and a clip installation base provided on the trim main body in a rear side area thereof with respect to the vehicle. The clip installation base includes: a clip settling portion configured to be opposed to the door inner panel and to be fitted with a clip to be mounted in a mounting hole formed in the door inner panel; and a clip rising wall portion provided continuously with the clip settling portion and forming a closed section portion together with the trim main body and the clip settling portion in a horizontal section, the clip rising wall portion including a bent portion having an angle so as to be convex outward.

9 Claims, 9 Drawing Sheets

VEHICLE DOOR TRIM

INCORPORATION BY REFERENCE

The disclosure of Japanese Patent Application No. 2012-004127 filed on Jan. 12, 2012 including the specification, drawings and abstract is incorporated herein by reference in its entirety.

BACKGROUND OF THE INVENTION

1. Field of the Invention

The invention relates to a vehicle door trim, and more particularly to an installation structure thereof.

2. Description of Related Art

According to a door trim installation structure described in Japanese Patent Application Publication No. 2011-126489 (JP 2011-126489 A), a clip installation base on which a clip to be mounted to a door inner panel is installed are arranged such that it is spanned between a rising wall portion (trim rising wall portion) of a trim main body and an ornament portion (trim general portion). At a leg portion of the clip installation base provided continuously with the ornament portion, rigidity of an upper side thereof is set higher than that of a lower side.

According to this related art, when a passenger collides secondarily with the door trim due to another vehicle's collision with the side of a host vehicle (side collision), torsional deformation occurs in the clip installation base due to a difference in rigidity between the upper side and the lower side of the leg portion, so that the clip installation base is tilted. Consequently, collision reaction force to the passenger is assumed to be capable of being suppressed. In addition, Japanese Patent Application Publication No. 2008-120128 (JP 2008-120128 A) and Japanese Patent Application Publication No. 2009-173197 (JP 2009-173197 A) also have disclosed other door trim installation structures.

However, because according to the related art, the leg portion of the clip installation base is formed in parallel to an input direction of a side collision load, there is a possibility that the load until the leg is buckled may be higher than expected. Furthermore, if it is attempted to control deformation mode using an ornament or the like, the clip installation base is restrained by the ornament or the like. That is, there is room for further improvement for reduction of the collision reaction force in the related art.

SUMMARY OF THE INVENTION

The invention has been achieved in views of the above-described circumstances and an object of the invention is to provide a door trim for a vehicle capable of effectively damping a collision reaction force that a passenger receives when he or she suffers secondary collision with a vehicle door trim due to another vehicle's collision with the side of the host vehicle.

A door trim for a vehicle according to an aspect of the invention includes: a trim main body formed so as to be bulging out toward an inner side of a vehicle compartment as an interior furnishing material of a door inner panel of a side door; and a clip installation base that is provided on the trim main body in a rear side area thereof with respect to the vehicle, the clip installation base having: a clip settling portion configured to be opposed to the door inner panel and to be fitted with a clip to be mounted in a mounting hole formed in the door inner panel; and a clip rising wall portion that is provided continuously with the clip settling portion and forms a closed section portion together with the trim main body and the clip settling portion in a horizontal section in a state where the door trim is installed in the vehicle, the clip rising wall portion including a bent portion having an angle so as to be convex outward of the closed section portion.

According to the above-described configuration, the trim main body formed to be bulging out toward the inner side of the vehicle compartment is provided as an interior furnishing material of the door inner panel and the clip installation base is provided on the trim main body in a rear side area thereof with respect to the vehicle. The clip installation base has the clip settling portion and the clip rising wall portion. The clip settling portion is configured to be opposed to the door inner panel and to be fitted with the clip to be mounted in the mounting hole formed in the door inner panel. Mounting the clip in the mounting hole results in installation of the trim main body to the door inner panel.

In the meantime, the clip rising wall portion is formed continuously with the clip settling portion, so that the closed section portion is formed together with the trim main body and the clip settling portion in a horizontal section in a state where the door trim is installed in the vehicle. In addition, the clip rising wall portion includes the bent portion that has an angle so as to be convex outward of the closed section portion.

When a passenger collides secondarily with the trim main body upon a side collision and an impact load is input to the clip installation base, a collision reaction force corresponding to the impact load depends on a buckling load of the clip rising wall portion. That is, the larger the buckling load of the clip rising wall portion is, the larger the collision reaction force that the passenger receives from the clip installation base is.

Therefore, according to the invention, the clip rising wall portion includes the bent portion. Even if the impact load is input to the clip installation base, the collision reaction force by the clip installation base is reduced because the bent portion has no force application point. Furthermore, when the collision load is input to the clip installation base, stress is concentrated at the bent portion. Consequently, the clip rising wall portion becomes easy to deform by buckling. Compared to a case where the clip rising wall portion is provided substantially in parallel to a load direction, the buckling load of the clip rising wall portion is reduced, so that rise-up of the collision reaction force at an initial period by the clip rising wall portion is reduced.

In the meantime, if the clip rising wall portion is deformed by buckling by the impact load input to the clip installation base so that it is bent inward of the closed sectional area, the clip rising wall portion comes to be arranged like in a state in which two portions thereof are stacked between the trim main body and the clip settling portion. Thus, an impact stroke of the clip rising wall portion is reduced by an amount corresponding to a thickness of the two portions of the clip rising wall portion, thereby preventing deformation of the trim main body and resulting in quick bottoming of the deformation.

However, because according to the invention, the bent portion of the clip rising wall portion has an angle so as to be convex outward of the closed section portion of the clip installation base, when the clip rising wall portion is deformed by buckling by the impact load, the clip rising wall portion is bent outward of the closed section portion. Consequently, between the trim main body and the clip settling portion, an impact stroke, which is set at design stage, can be secured. That is, when the bent portion of the clip rising wall portion is provided, a starting point of bending of the clip rising wall portion is provided, which stabilizes buckling deformation mode. The buckling load of the clip rising wall portion can be adjusted easily by the angle of the bent portion.

Therefore, the invention has an excellent advantage that a collision reaction force that a passenger receives when he or she collides secondarily with the door trim upon a side collision can be damped efficiently.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. An arrow FR in the figures indicates forward in the longitudinal direction of a vehicle, an arrow UP indicates upward in the vertical direction of the vehicle and an arrow OUT indicates outward in the vehicle width direction.

(Configuration of Installation Structure of Vehicle Door Trim)

Figure 1:
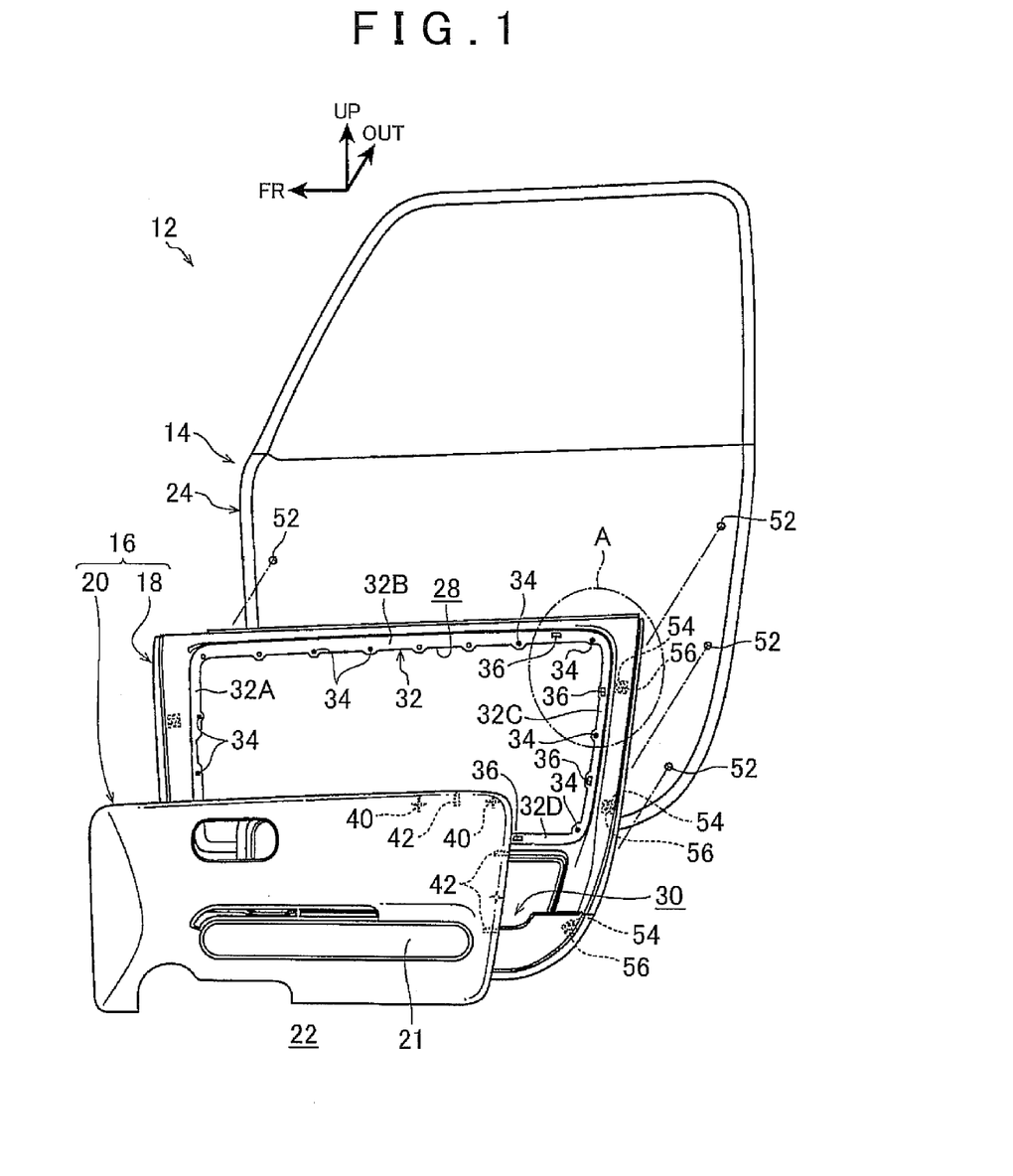
FIG. 1 is an exploded perspective view of a side door, in which an installation structure of a door trim for a vehicle according to an embodiment of the invention is used.
Figure 2:
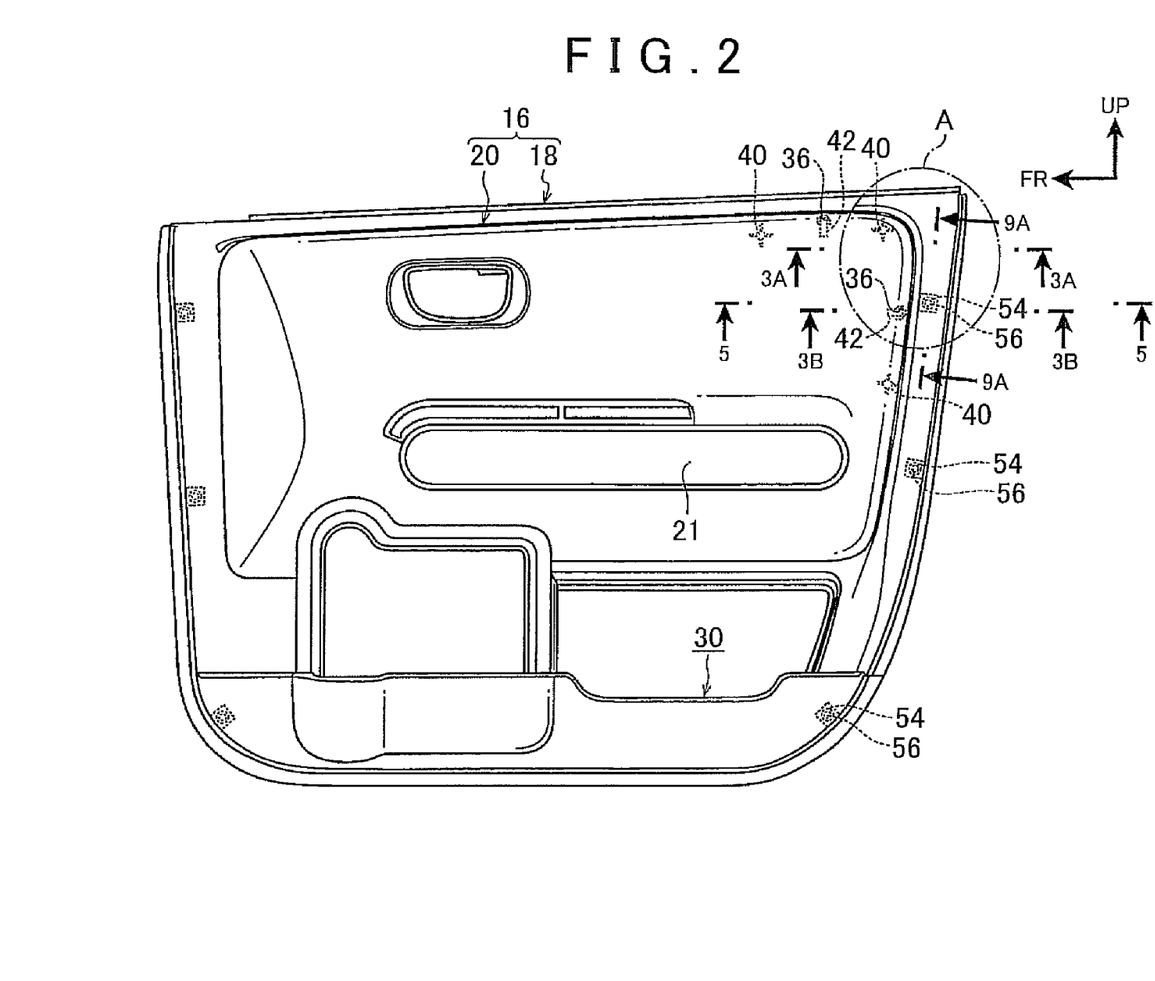
FIG. 2 is a front view of the door trim, in which the installation structure of the door trim for a vehicle according to the embodiment of the invention is used.

FIG. 1 shows an exploded side view of a side door 12 of a passenger vehicle to which an installation structure of a vehicle door trim of the present embodiment is applied, the side door 12 including a door panel 14 and a door trim 16 (base panel 18 and decorative panel 20) that is a trim main body when viewed from the interior side of a vehicle compartment 22. FIG. 2 shows a front view of the door trim 16 in which the decorative panel 20 is installed on a central portion of the base panel 18 occupying an outer periphery of the door trim 16.

As shown in these figures, the door panel 14 includes a door outer panel (not shown) and a door inner panel 24, and the door inner panel 24 constitutes an inner panel of the side door 12. The door trim 16 is installed on the inner side (inside of the vehicle compartment 22), in the width direction of a vehicle, of the door inner panel 24 so as to be opposed to the door inner panel 24. The door trim 16 includes a base panel 18 to be installed on the inside of the vehicle compartment 22 of the door inner panel 24 and a decorative panel 20 to be installed on the base panel 18.

Figure 3A:
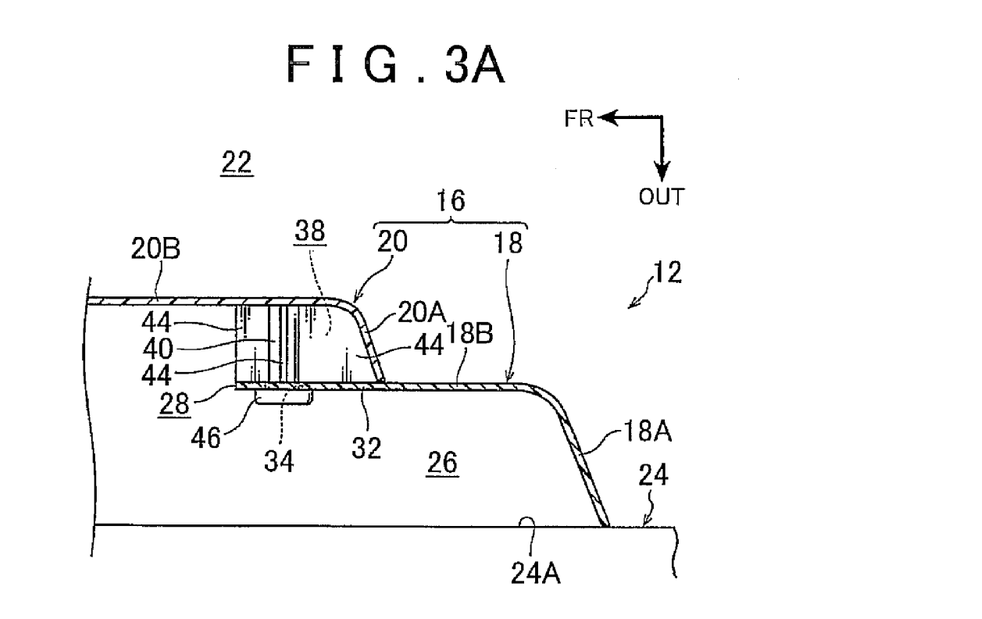
FIG. 3A is an enlarged sectional view of the door trim taken along the line 3A-3A i$_n$ FIG. 2.
Figure 3B:
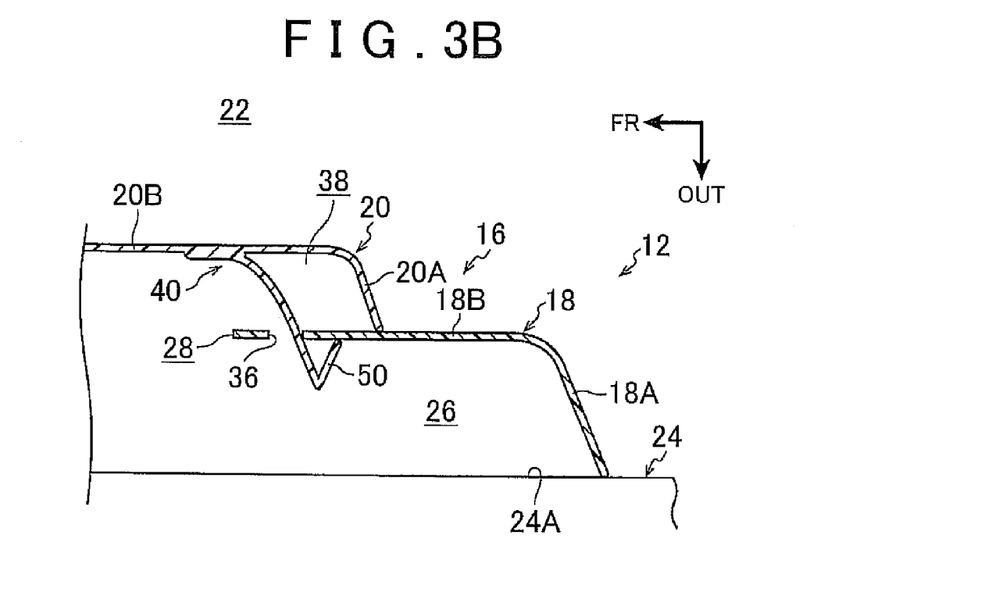
FIG. 3B is an enlarged sectional view of the door trim taken along the line 3B-3B in FIG. 2.
Figure 5:
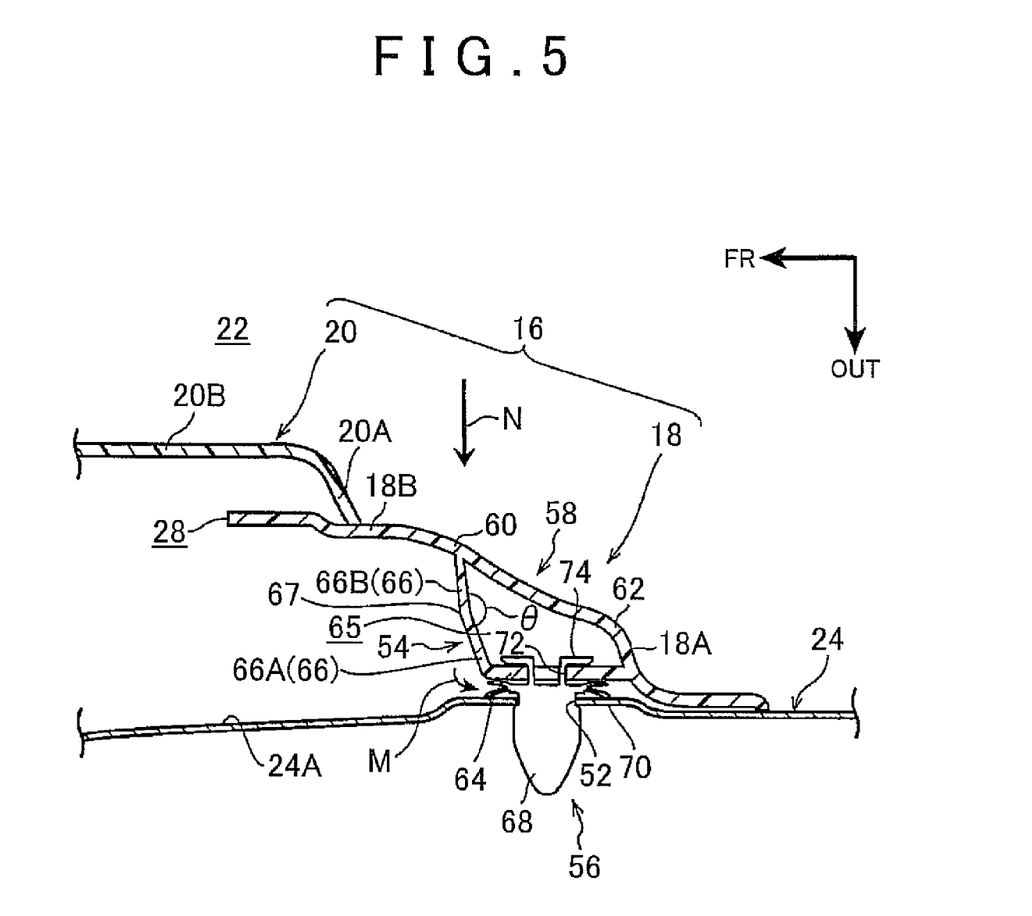
FIG. 5 is an enlarged sectional view of the door trim taken along the line 5-5 in FIG. 2.

The base panel 18 is substantially rectangular and a substantially rectangular opening 28 is formed in an upper portion of the base panel 18. As shown in FIG. 2, the opening 28 is so designed as to be closed by the decorative panel 20. FIGS. 3A, 3B and FIG. 5 show sectional views taken along the lines indicated in FIG. 2 and these figures illustrate a rising wall portion 18A side of the base panel 18 alone in an enlarged manner. FIGS. 3A and 3B illustrate the rising wall portion 18A in a simplified manner, that is, in a substantially straight shape, different from FIG. 5.

As shown in FIGS. 3A and 3B, the rising wall portion 18A, which rises outward in the vehicle width direction from a general portion 18B of the base panel 18, is provided on the outer edge of the base panel 18 as a trim rising wall portion. With the base panel 18 installed on the door inner panel 24, there is provided a clearance 26 between a general portion 24A of the door inner panel 24 and the general portion 18B of the base panel 18. That is, the base panel 18 is formed so as to be bulging out toward the inner side of the vehicle compartment 22.

As shown in FIG. 1, a storage portion 30 that can store a plastic bottle or the like is provided below the opening 28 formed in the base panel 18 and a frame-like installation base surface 32 is formed on a surrounding portion along the opening 28. A plurality of circular insertion holes 34 are provided in a front frame 32A located at the front portion (front side with respect to the longitudinal direction of the vehicle body) on the installation base surface 32. As well as the above-mentioned insertion holes 34, rectangular engagement holes 36 are provided at appropriate positions in an upper frame 32B located on the top of the installation base surface 32, a back frame 32C located on the back portion (rear side with respect to the longitudinal direction of the vehicle body), and a lower frame 32D located at a lower portion.

The insertion hole 34 is provided to the front and the rear of an engagement hole 36 with respect to the longitudinal direction of the vehicle, and above and below the engagement hole 36 with respect to the vertical direction of the vehicle. Although not shown here, the engagement holes 36 are provided at a height equivalent to a chest position or a waist position of a passenger seated in a seat.

On the other hand, a door armrest 21 is provided on a central portion, with respect to the vertical direction of the vehicle, of the decorative panel 20 along the longitudinal direction of the vehicle. A power window switch (not shown) for lifting up and down a side glass (not shown) installed in the side door 12 and the like are provided on the upper surface of the door armrest 21.

As shown in FIGS. 3A and 3B, the rising wall portion 20A that rises outward in the vehicle width direction from the general portion 20B of the decorative panel 20 is provided on the outer periphery of the decorative panel 20, and there is provided a clearance 38 between the decorative panel 20 and the base panel 18. That is, the decorative panel 20 is disposed so as to be bulging out toward the inner side of the vehicle compartment 22 relative to the general portion 18B of the base panel 18. Here, the rising wall portion 20A is represented in a simplified manner, that is, in a substantially straight shape. Then, in the present embodiment, the general portion 20B of the decorative panel 20 and the general portion 18B of the base panel 18 are utilized as a trim general portion.

Installation bosses 40 and engagement pieces 42 are provided on the outer periphery of the decorative panel 20, corresponding to the insertion holes 34 and the engagement holes 36 provided in the installation base surface 32 of the base panel 18. That is, an installation boss 40 is provided to the front and the rear of an engagement piece 42 with respect to the longitudinal direction of the vehicle, and above and below an engagement piece 42 with respect to the vertical direction of the vehicle. Only the installation bosses 40 and the engagement pieces 42 disposed on a rear portion, with respect to the vehicle, of the decorative panel 20 are shown here.

As shown in FIG. 3A, the installation boss 40 is formed cylindrically in a size such that it can be inserted into the insertion hole 34 formed in the base panel 18. Reinforcement ribs 44 are provided on the circumference of the installation boss 40 such that they are stretched in a cross shape substantially in the vertical direction of the vehicle and substantially in the longitudinal direction of the vehicle from the outer peripheral surface of the installation boss 40.

The reinforcement ribs 44 are set to have a lower height than the installation boss 40, so that a tip portion of the installation boss 40 can be inserted through the insertion hole 34. When the tip portion of the installation boss 40 is inserted into the insertion hole 34, the tip portion of the installation boss 40 is exposed from the back surface (outward of the vehicle) of the installation base surface 32 and a movement of the installation boss 40 is blocked with the front end faces of the reinforcement ribs 44 in contact with the front surface (inward of the vehicle) of the installation base surface 32. At this time, the rising wall portion 20A of the decorative panel 20 is in contact with the general portion 18B of the base panel 18.

With the movement of the installation boss 40 blocked, as shown in FIG. 3A, the tip portion of the installation boss 40 is thermally-caulked so that the installation boss 40 is fixed via a molten portion 46. Consequently, the decorative panel 20 is attached to the base panel 18 via the installation boss 40.

On the other hand, as shown in FIG. 3B, the engagement piece 42 is extended in a belt-like shape from the rear surface of the decorative panel 20 outward in the vehicle width direction and rearward with respect to the vehicle and formed obliquely with respect to a straight line along the vehicle width direction. In addition, an engagement pawl 50 that is bent back substantially in a V-shape as viewed sideway is formed at the tip portion of the engagement piece 42 so as to be extended inward in the vehicle width direction and rearward with respect to the vehicle. The engagement piece 42 can be inserted into the engagement hole 36 formed in the base panel 18 and the engagement pawl 50 is fixed by the periphery of the engagement hole 36 in a state in which the engagement piece 42 is elastically deformed.

As shown in FIG. 1, in a vehicle upper area A of the door trim 16, a clip 56 and a clip installation base 54 are provided in the vicinity of the engagement piece 42 and the engagement hole 36 (on the rear, upper side with respect to the vehicle). Circular mounting holes 52 are formed in an outer periphery of the door inner panel 24. The clip installation bases 54 protrude from the base panel 18. The vehicle upper area A is an area of the door trim 16 that is located at an upper side in a rear side area, with respect to the vehicle, of the door trim 16. While the clips 56 and the clip installation bases 54 are provided at appropriate intervals at the periphery of the door trim 16, the clip 56 and the clip installation base 54 in the vehicle upper area A will be described as an example of a clip 56 and a clip installation base 54 that are provided in a rear side area of the door trim 16 with respect to the vehicle.

FIG. 5 illustrates an enlarged sectional view of the clip installation base 54 and its periphery taken along the line 5-5 in a vehicle upper area A of the door trim 16 shown in FIG. 2. As shown in FIG. 5, the rising wall portion 18A is provided on the outer periphery of the general portion 18B of the base panel 18. On the rising wall portion 18A side of the general portion 18B, a stepped portion 58 is provided so as to be waved in the longitudinal direction of the vehicle and sagging portions 60, 62 are provided so as to be convex toward the inner side of the vehicle compartment 22.

The clip installation base 54 is formed to have an L-shaped section when cut along the longitudinal direction of the vehicle. The clip installation base 54 is spanned between the general portion 18B and the rising wall portion 18A of the base panel 18. The clip installation base 54 includes a clip settling portion 64 and a clip rising wall portion 66, and the clip settling portion 64 is formed continuously with the rising wall portion 18A of the base panel 18.

The clip settling portion 64 is extended forward with respect to the vehicle from the rising wall portion 18A and capable of being opposed to the door inner panel 24, that is, configured to be positioned in parallel with the door inner panel 24. The clip rising wall portion 66 is extended inward in the vehicle width direction from an end portion of the clip settling portion 64 and the clip rising wall portion 66 is formed continuously with the general portion 18B of the base panel 18. Then, in a horizontal section, a closed sectional area 65 is formed by the base panel 18 and the clip installation base 54.

Substantially in a central portion in a height direction, or along the vehicle width direction, of the clip rising wall portion 66, a bent portion 67 having an angle, θ, so as to be convex outward of the closed sectional area 65 is provided. A vertical wall portion 66A is extended from an end of the clip settling portion 64 in the clip rising wall portion 66 inward in the vehicle width direction and forward with respect to the vehicle, and an inclined portion 66B is extended from the vertical wall portion 66A inward in the vehicle width direction and forward with respect to the vehicle.

That is, both the vertical wall portion 66A and the inclined portion 66B are inclined with respect to each other so as to be convex forward with respect to the vehicle. The bent portion 67 is formed between the inclined portion 66B and the vertical wall portion 66A. An angle of the inclined portion 66B relative to the clip settling portion 64 is steeper, or closer to 90°, than that of the vertical wall portion 66A. As an example here, an angle θ of the bent portion 67 defined by the vertical wall portion 66A and the inclined portion 66B is set to approximately 165°. Preferably, the angle θ of the bent portion 67 is set in a range of 90°<θ<180°. It is more preferable that the angle θ of the bent portion be 120°<θ<170°.

Figure 4A:
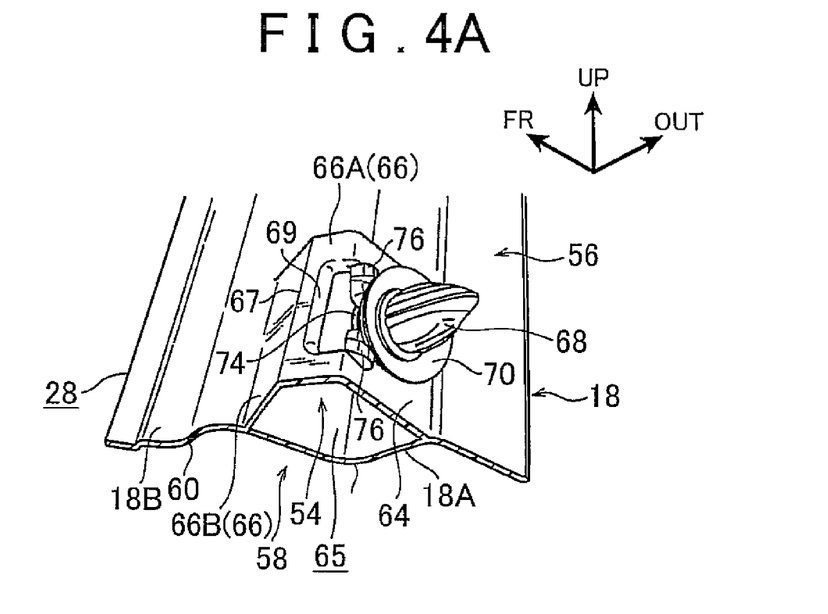
FIG. 4A is a perspective view of a clip installation base provided on the door trim, illustrating a state in which a clip is installed.
Figure 4B:
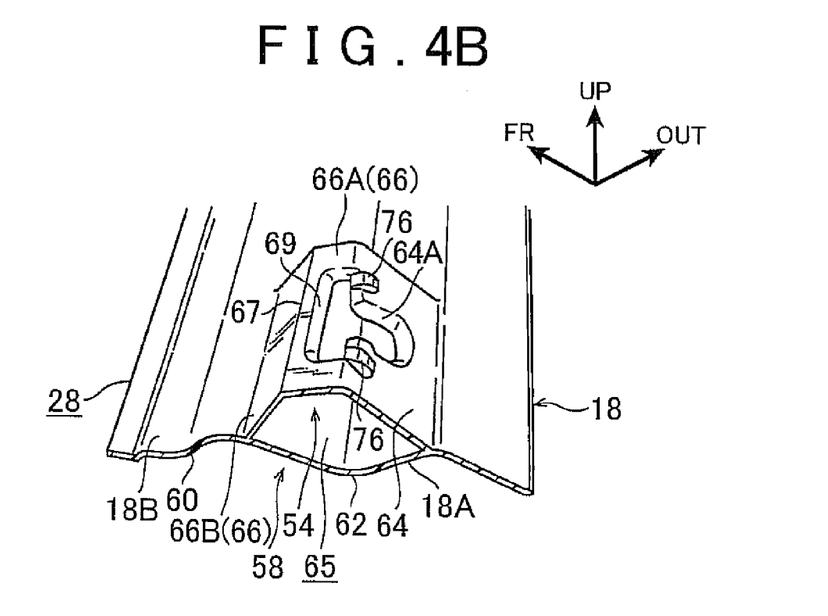
FIG. 4B is a perspective view of the clip installation base provided on the door trim, illustrating a state in which no clip is installed.

On the other hand, as shown in FIGS. 4A and 4B, the clip 56 can be mounted on the clip settling portion 64 of the clip installation base 54. As shown in FIG. 4A, the clip 56 has an elastically-deformable conical portion 68 and as shown in FIG. 5, the conical portion 68 is pressed into the mounting hole 52 in the door inner panel 24. A flange 70 is provided at the base portion of the conical portion 68 and can make contact with the periphery of the mounting hole 52.

A neck portion 72 and a flange portion 74 are provided integrally with the flange portion 70 on a side opposite to the conical portion 68 across the flange portion 70, and the clip settling portion 64 can be sandwiched between the flange portion 74 and the flange portion 70. As shown in FIG. 4B, an insertion hole 69 is formed in the clip rising wall portion 66, and the neck portion 72 and the flange portion 74 (for both, see FIG. 5) can be put in the insertion hole 69. Furthermore, an attachment hole 64A that communicates with the insertion hole 69 is provided in the clip settling portion 64. Projections 76 are provided with the attachment hole 64A interposed therebetween on peripheral portions of the attachment hole 64A on the insertion hole 69 side.

In a process of inserting the neck portion 72 and the flange portion 74 into the insertion hole 69, as shown in FIG. 4A, when the flange portion 70 overrides the projections 76, the flange portion 70 is blocked from coming off, so that the clip 56 is positioned relative to the clip settling portion 64 via the flange portion 70. Then, with this state, the neck portion 72 is disposed within the attachment hole 64A and a surrounding portion of the attachment hole 64A is sandwiched by the flange portion 70 and the flange portion 74. In this state, the clip 56 is attached to the clip installation base 54.

As shown in FIG. 5, the conical portion 68 of the clip 56 is pressed into the mounting hole 52 of the door inner panel 24 and a surrounding portion of the mounting hole 52 is sandwiched by the conical portion 68 and the flange portion 70, so that the clip 56 is mounted in the mounting hole 52. Consequently, the door trim 16 is installed to the door inner panel 24 via the clips 56.

(Operation and Effects of Installation Structure of Vehicle Door Trim)

As shown in FIG. 1, the door trim 16 includes the base panel 18 and the decorative panel 20 and the decorative panel 20 is attached inside of the base panel 18. The insertion holes 34 and the engagement holes 36 are formed in the installation base surface 32 provided at a surrounding portion of the opening 28 formed in the base panel 18.

With the installation boss 40 formed on the decorative panel 20 inserted into the insertion hole 34 and the tip portion of the installation boss 40 thermally-caulked as shown in FIG. 3A, the decorative panel 20 is fixed to the base panel 18. In this state, the clearance 38 formed between the decorative panel 20 and the base panel 18 is filled with the installation boss 40 and the reinforcement ribs 44. Consequently, the decorative panel 20 is securely attached to the base panel 18 via the installation bosses 40 and the reinforcement ribs 44. That is, the decorative panel 20 is supported by the installation bosses 40 and the reinforcement ribs 44 relative to the base panel 18, so that the decorative panel 20 is hard to deflect. Thus, rigidity of the door trim 16 at normal usage time is secured.

As shown in FIG. 3B, the engagement piece 42 formed on the decorative panel 20 is inserted into the engagement hole 36 and the engagement pawl 50 is fixed by the periphery of the engagement hole 36 in a state in which the engagement piece 42 is elastically deformed. As a result, a pressing force that presses the decorative panel 20 outward in the vehicle width direction via the engagement piece 42 is applied, so that a reaction force resisting the pressing force is generated in the decorative panel 20. Thus, the decorative panel 20 can secure necessary rigidity at this portion. Then, if when another vehicle collides with a given vehicle from a side direction, a passenger collides secondarily with its door trim 16 and the decorative panel 20 is deformed toward the base panel 18 side, engagement of the engagement pawl 50 of the engagement piece 42 with the periphery of the engagement hole 36 is released, thereby damping a collision reaction force due to the secondary collision of the passenger upon the side collision. Thus, performance against the side collision upon a secondary collision of a passenger can be secured.

As shown in FIG. 5, the clip rising wall portion 66 that is part of the clip installation base 54 includes the vertical wall portion 66A located on the clip settling portion 64 side and the inclined portion 66B located on the base panel 18 side. The bent portion 67 is formed by the vertical wall portion 66A and the inclined portion 66B, and the bent portion 67 is bent outward of the closed sectional area 65 formed by the base panel 18 and the clip installation base 54.

When a passenger collides secondarily with the door trim 16, the collision reaction force resisting the impact load depends on a buckling load of the clip rising wall portion 66. That is, as the buckling load of the clip rising wall portion 66 increases, the collision reaction force that the passenger receives from the clip installation base 54 increases correspondingly.

Therefore, according to the present embodiment, the bent portion 67 is provided on the clip rising wall portion 66 as described above. When an impact load is input to the clip installation base 54, stress is concentrated at the bent portion 67. Consequently, the clip rising wall portion 66 is easily deformed by buckling. Compared to a case where the clip rising wall portion is provided substantially in parallel to a load direction, which is not shown, the buckling load of the clip rising wall portion 66 is reduced, so that rise-up of the collision reaction force at an initial period by the clip rising wall portion 66 is decreased.

Figure 7A:
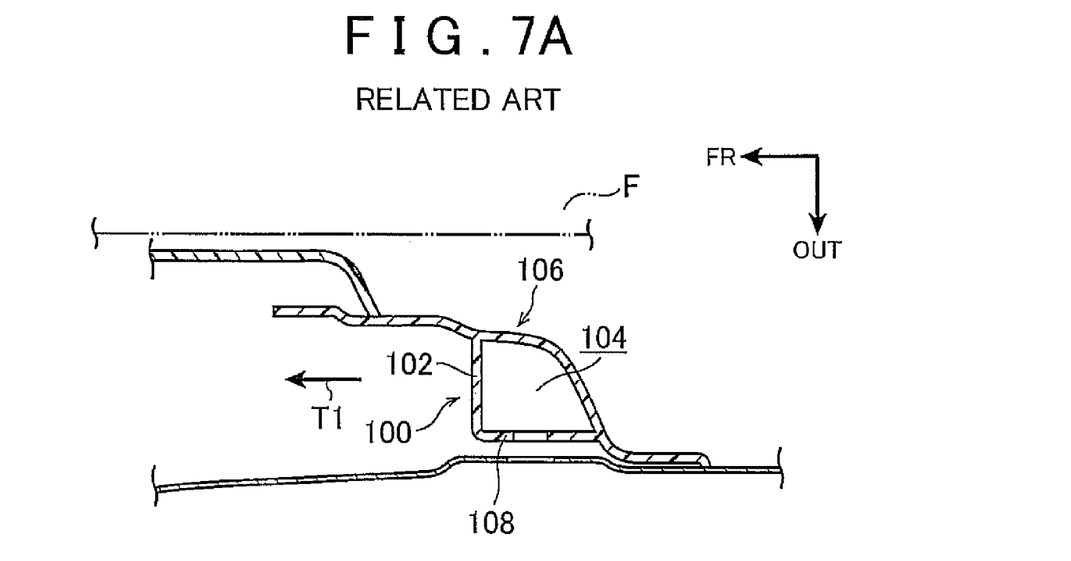
FIGS. 7A and 7B are enlarged sectional views corresponding to FIGS. 6A and 6B, illustrating comparison examples corresponding to FIGS. 6A and 6B.
Figure 7B:
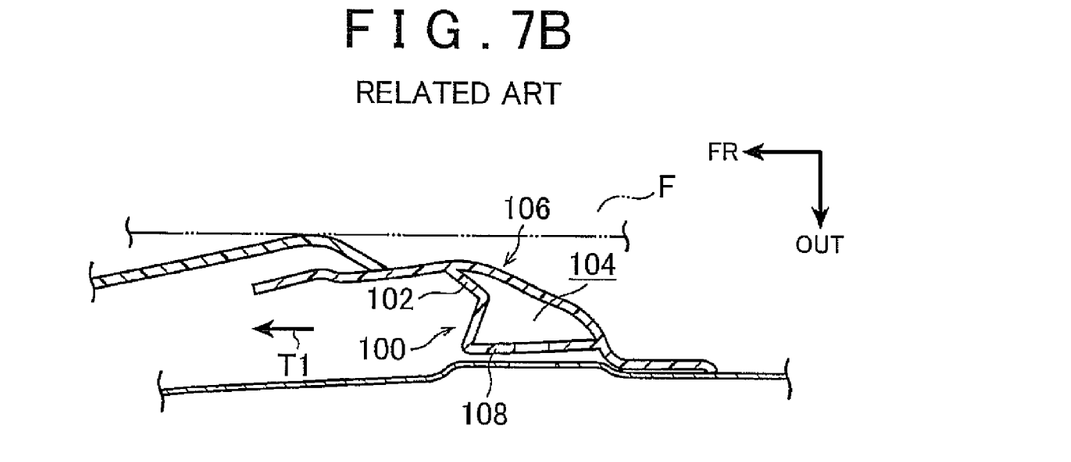

Assume that, as shown in FIGS. 7A and 7B, a clip rising wall portion 102 is deformed by buckling and bent inward of a closed sectional area 104 by an impact load input to a clip installation base 100 when a secondary collision of a passenger F occurs. In this case, although not shown, the clip rising wall portion 102 is brought into a state where two portions thereof are stacked between a door trim 106 and a clip settling portion 108 within the closed sectional area 104. Thus, an impact stroke of the clip rising wall portion 102 is decreased by an amount corresponding to a thickness of the two portions of the clip rising wall portion 102, thereby preventing deformation of the door trim 106 to hasten bottoming of the deformation.

Figure 6A:
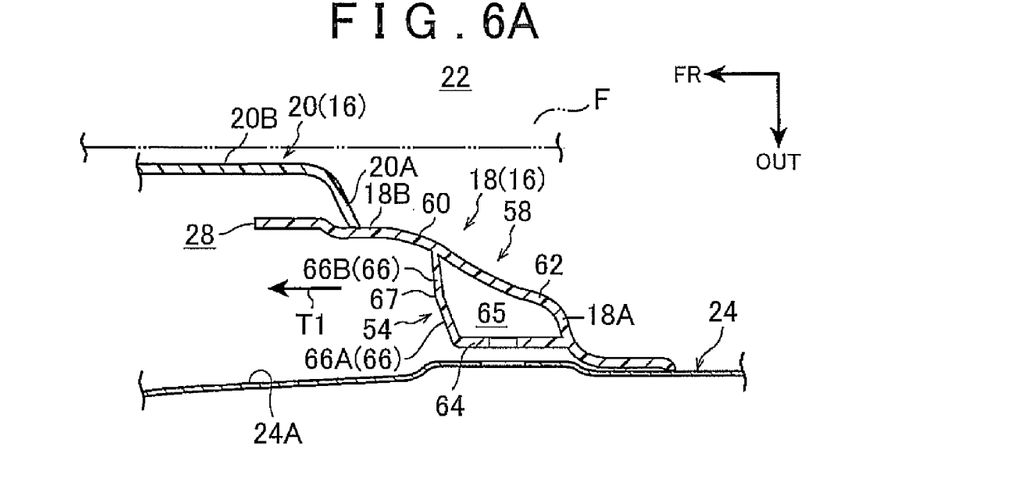
FIGS. 6A-6C are enlarged sectional views corresponding to FIG. 5, illustrating processes of deformation of the door trim shown in FIG. 5.
Figure 6B:
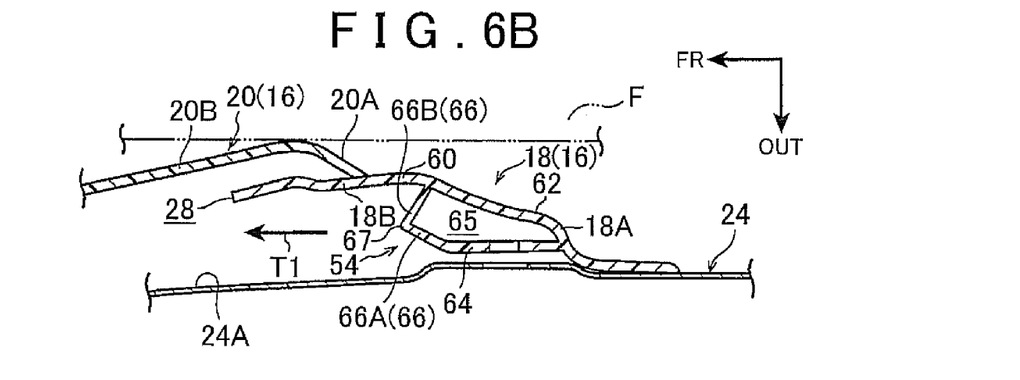
Figure 6C:
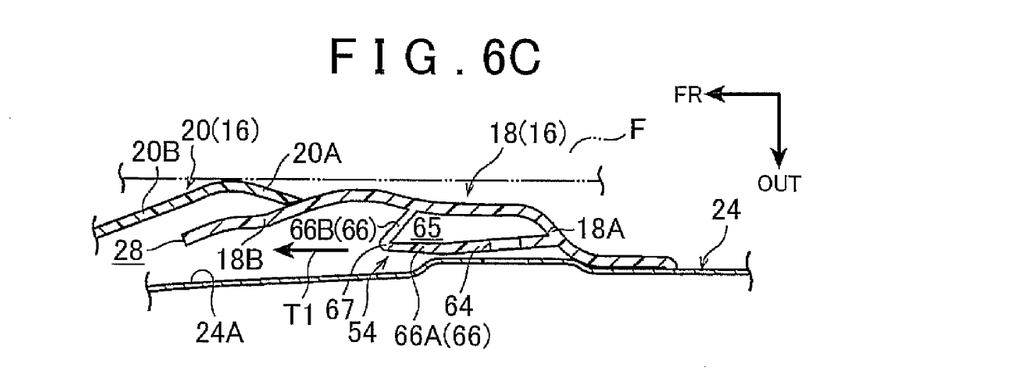

However, according to the present embodiment, as shown in FIG. 6A, the bent portion 67 provided on the clip rising wall portion 66 is bent outward of the closed sectional area 65 of the clip installation base 54 (thereby having an angle). In this case, as shown in FIGS. 6B and 6C, when an impact load is input to the clip installation base 54 due to the secondary collision of the passenger F, the clip rising wall portion 66 is deformed by buckling and the clip rising wall portion 66 is bent outward of the closed sectional area 65.

Thus, the impact stroke, which is set up on design stage, can be secured between the door trim 16 and the clip settling portion 64. That is, the bent portion 67 in the clip rising wall portion 66 is provided to provide a starting point of bending of the clip rising wall portion 66 so as to stabilize buckling deformation mode. Consequently, the collision reaction force when the passenger F collides secondarily with the door trim upon a side collision can be damped efficiently. In the meantime, the buckling load of the clip rising wall portion 66 can be adjusted easily depending on an angle θ of the bent portion 67.

As shown in FIG. 5, the vertical wall portion 66A is extended inward in the vehicle width direction and forward with respect to the vehicle from an end of the clip settling portion 64 of the clip rising wall portion 66, and the inclined portion 66B is extended inward in the vehicle width direction and forward with respect to the vehicle form the vertical wall portion 66A. The bent portion 67 is formed between the inclined portion 66B and the vertical wall portion 66A.

Thus, the bent portion 67 is located inward in the vehicle width direction and forward with respect to the vehicle relative to the clip settling portion 64. That is, the bent portion 67 has no force application point and when the impact load is input to the clip installation base 54, a moment M that is directed outward in the vehicle width direction occurs in the vertical wall portion 66A around an end of the clip settling portion 64. In a consequence, the clip rising wall portion 66 is deformed by buckling outward of the closed sectional area 65. Thus, the buckling deformation mode can be further stabilized.

As shown in FIGS. 6A to 6C, as the clip installation base 54 is deformed and falls down, impact energy is absorbed thereby efficiently damping the collision reaction force that the passenger F receives. For this reason, according to the present embodiment, the vertical wall portion 66A and the inclined portion 66B are tilted forward with respect to the vehicle as they approach the bent portion 67.

Here, although the door trim 16 is deformed in a wide area due to the secondary collision of the passenger F, a tension is generated in the door trim 16 from the rising wall portion 18A toward the general portion 18B because of the deformation of the door trim 16. In the clip installation base 54 provided in a rear side area, with respect to the vehicle, of the door trim 16, a tension T1 is generated mainly in a forward direction of the vehicle.

Thus, according to the present embodiment, compared to a case where the vertical wall portion 66A or the inclined portion 66B is formed in parallel to the vehicle width direction, the clip installation base 54 is easier to be deformed by the tension T1 generated in the door trim 16. That is, the clip installation base 54 is allowed to fall down using the tension T1. In the meantime, needless to say, the vertical wall portion 66A or the inclined portion 66B may be formed in parallel to the vehicle width direction.

The clip installation base 54 is formed so as to be spanned between the general portion 18B and the vertical wall portion 18A of the base panel 18. That is, within the closed sectional portion 65 of the clip installation base 54, no wall is stretched between the clip settling portion 64 and the clip rising wall portion 66 along the longitudinal direction of the vehicle.

Therefore, the clip installation base 54 is affected by the tension T1 easily. That is, when the tension T1 is generated in the door trim 16, the clip installation base 54 is deformed and falls down absorbing the impact energy. As a result, the collision reaction force that the passenger F receives can be damped efficiently.

As shown in FIG. 5, the stepped portion 58 is formed on the rising wall portion 18A side of the general portion 18B of the base panel 18 so as to be waved in the longitudinal direction of the vehicle, and the sagging portions 60, 62 are provided so as to protrude to the inner side of the vehicle compartment 22. Thus, as shown in FIGS. 6A to 6C, when the clip installation base 54 falls down, the sagging portions 60, 62 are stretched to damp the tension in the general portion 18B of the door trim 16. That is, the clip installation base 54 becomes further easy to fall down, thereby relaxing the impact that the passenger F receives.

(Modification of Clip Installation Base)

As shown in FIG. 5, the door trim 16 is installed to the door inner panel 24 via the clip 56. When the clip 56 is mounted in the mounting hole 52, generally, the clip 56 is pressed into the mounting hole 52. For this purpose, the clip installation base 54 needs to have a rigidity capable of bearing the pressing force (axial force) N that presses the clip 56 into the mounting hole 52 in the door inner panel 24.

Figure 8A:
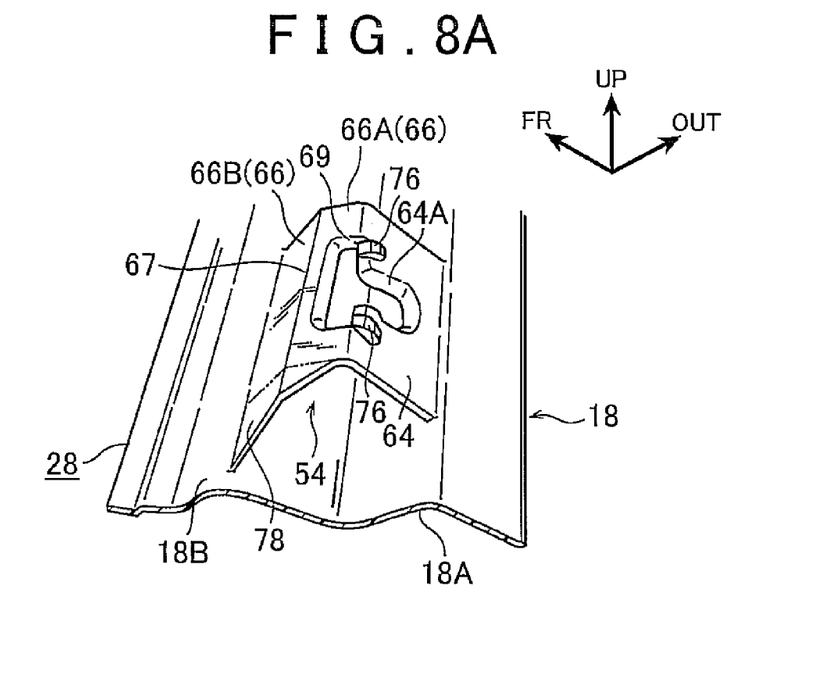
FIGS. 8A and 8B are perspective views corresponding to FIGS. 4A and 4B illustrating modifications of the clip installation base provided on the door trim.

Thus, according to the present embodiment, as shown in FIG. 8A, a rib 78 is extended downward of the vehicle from the clip rising wall portion 66 and the rib 78 is provided integrally with the general portion 18B of the base panel 18. The rib 78 has a triangular shape as viewed along the longitudinal direction of the vehicle and is shaped so as to expand gradually from the clip settling portion 64 side toward the general portion 18B.

As a result, as shown in FIG. 5, when the clip 56 on the clip installation base 54 is pressed into the mounting hole 52, a contact pressure based on the axial force N input in the vehicle width direction can be lowered thereby damping a stress generated in the clip installation base 54.

Figure 9A:
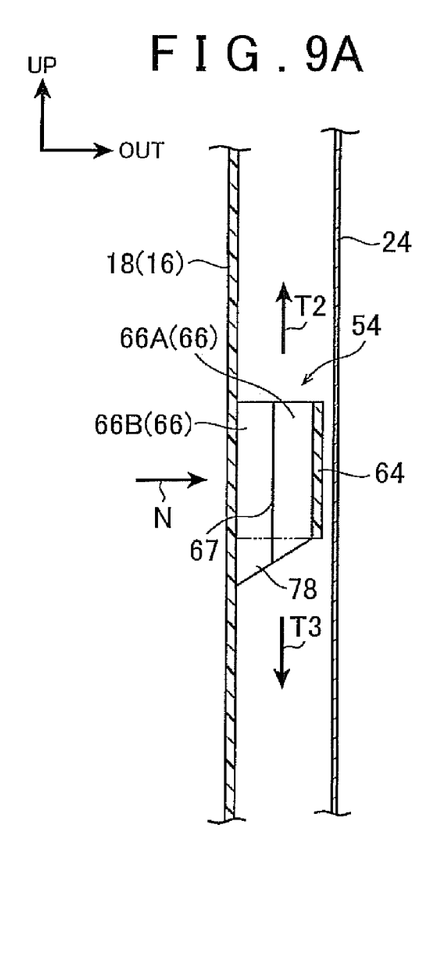
FIG. 9A is an enlarged sectional view of the door trim taken along the line 9A-9A in FIG. 2.
Figure 9B:
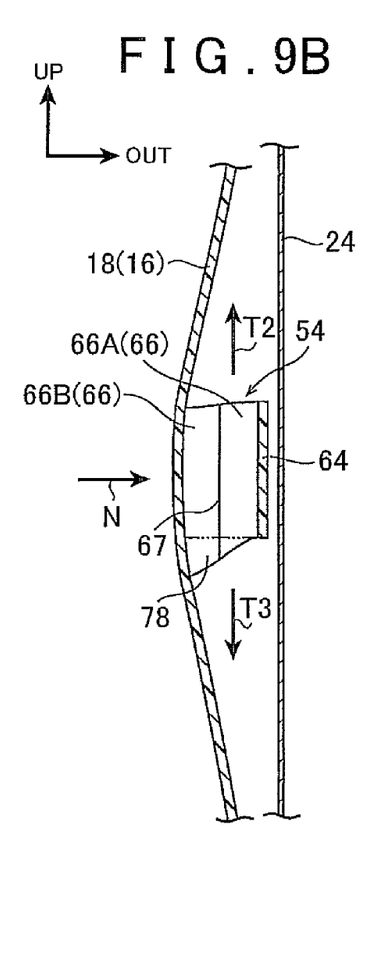
FIG. 9B is an enlarged sectional view corresponding to FIG. 9A illustrating a state in which the door trim is deformed.

When the clip 56 is mounted in the mounting hole 52, as shown in FIGS. 9A and 9B, tensions T2, T3 are generated in the vertical direction of the vehicle of the clip installation base 54. Because the clip installation base 54 is arranged on an upper side relative to the vehicle of the door trim 16, the tension T3 generated in a downward direction of the vehicle in the clip installation base 54 is larger than the tension T2 generated in an upward direction of the vehicle. Thus, the rib 78 projected downward of the vehicle from the clip rising wall portion 66 of the clip installation base 54 can hamper a damage that the clip installation base 54 receives, thereby preventing the deformation by buckling of the clip installation base 54.

Because the rib 78 formed integrally with the general portion 18B is projected from the clip rising wall portion 66 of the clip installation base 54, the area of the clip rising wall portion 66 in the clip installation base 54 is increased by an amount corresponding to the rib 78 provided according to the modification. Thus, when the tension T1 (see FIG. 6A) is applied in the forward direction of the vehicle, the clip rising wall portion 66 becomes more easy to fall down following a deformation of the general portion 18B thereby facilitating the deformation of the clip installation base 54 further.

Although, as shown in FIG. 5, it has been described that when the clip 56 is pressed into the mounting hole 52, the axial force N input to the clip installation base 54 is input in the vehicle width direction, the axial force N may be input obliquely with respect to the vehicle width direction depending on the shape of the door trim 16. In this case, from viewpoints of securing the rigidity of the clip installation base 54, it may be better to provide the rib 78 on the clip settling portion 64 side.

Although, as shown in FIG. 8A, the rib 78 is projected downward, with respect to the vehicle, from the clip rising wall portion 66 of the clip installation base 54, the rib 78 may be projected upward with respect to the vehicle. Because the clip installation base 54 is provided on the upper side with respect to the vehicle, the tension T3 generated in a downward direction of the vehicle in the clip installation base 54 is larger than the tension T2 generated in an upward direction of the vehicle, as described above. Thus, the door trim 16 on a lower side of the vehicle relative to the clip installation base 54 is deformed more largely. Thus, the rib 78 projected downward of the vehicle from the clip rising wall portion 66 side is more effective for deformation of the clip installation base 54.

Figure 8B:
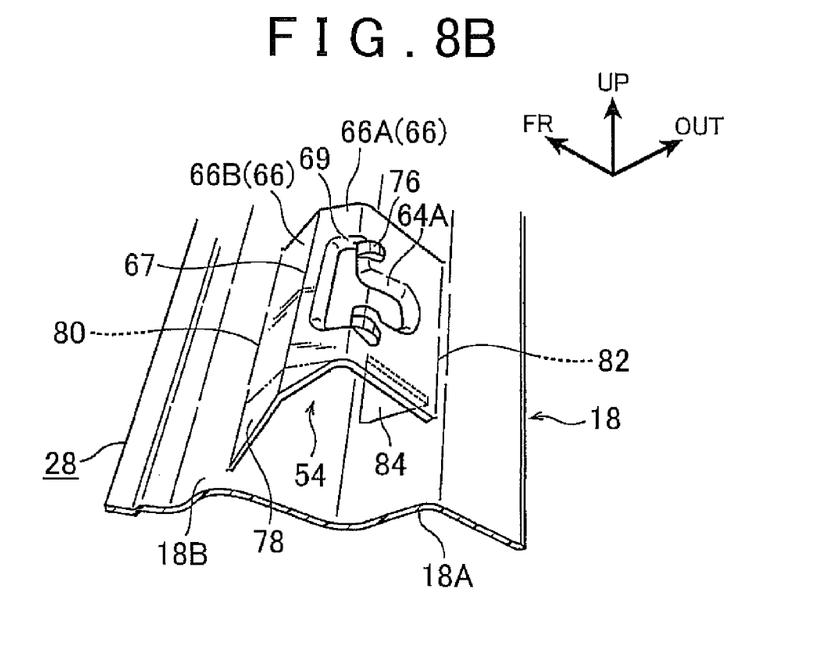

Furthermore, as shown in FIG. 8B, a connecting portion (ridge portion) 80 between the clip rising wall portion 66 of the clip installation base 54 and the general portion 18B of the base panel 18 or a connection portion 82 between the clip settling portion 64 of the clip installation base 54 and the rising wall portion 18A of the base panel 18 may be provided with a stay 84, which is arranged inside of the clip installation base 54 along the longitudinal direction of the vehicle in order to reinforce the connecting portions 80, 82.

Consequently, the buckling deformation of the clip installation base 54 can be suppressed when the door trim 16 is mounted to the door inner panel 24 (see FIG. 5). Although the stay 84 is illustrated on a lower side, with respect to the vehicle, of the connecting portion 82 for convenience of drawing, if the stay 84 is provided at a central portion, in the vertical direction of the vehicle, of the connecting portion 82, the stay 84 enters the mounting hole 64A or the insertion hole 69 when the clip installation base 54 falls down, thereby not obstructing the falling of the clip installation base 54.

(Supplement for Present Embodiment)

Generally, when the passenger makes contact with the door trim 16 as the secondary collision, an area A of the door trim 16 as shown in FIG. 2 is at a height corresponding to a position of passenger's chest because the passenger is sitting in the seat. Thus, the arrangement of the base panel 18 including the clip installation base 54 according to the present embodiment in the area A of the door trim 16 effectively damps the collision reaction force that the passenger's chest receives from the door trim 16. Needless to say, the configuration of the base panel 18 including the clip installation base 54 may be applied to other areas than the area A in the rear side area, with respect to the vehicle, of the door trim 16.

Furthermore, although, as shown in FIG. 5, according to the present embodiment, the door trim 16 is formed of the base panel 18 and the decorative panel 20, the door trim 16 may be formed by molding the base panel 18 and the decorative panel 20 integrally.

Furthermore, although according to the present embodiment, the clip installation base 54 is formed so that the sectional shape of the clip installation base 54 taken along the longitudinal direction of the vehicle is L-shaped, the clip installation base 54 may be of any shape as long as it falls down when a load applied along the longitudinal direction of the vehicle is input to the door trim 16. Thus, the sectional shape of the clip installation base 54 does not need to be L-shaped.

Although in the present embodiment, the pivot type side door 12 has been illustrated and described, the invention may be applied to a slide type side door.

Although one embodiment of the invention has been described above, the invention is not restricted to the above-described examples. Needless to say, the invention may be carried out in a variety of modifications within the scope not departing from the gist thereof.

The clip installation base may be arranged on the trim main body in an upper side area thereof with respect to the vehicle.

Generally, when the passenger makes contact with the trim main body as a secondary collision, an upper side, with respect to a vehicle, of the trim main body is at a height corresponding to a position of passenger's chest because the passenger is sitting in the seat. Thus, the above-described configuration can effectively reduce the impact that the passenger's chest receives from the trim main body. Therefore, the invention has an excellent advantage that the collision reaction force that the passenger receives can be suppressed effectively.

The trim main body may include: a trim general portion that forms a trim design surface; and a trim rising wall portion that is provided on an outer periphery of the trim general portion and rises outward in the vehicle width direction, the clip settling portion may jut out from the trim rising wall portion, and the clip rising wall portion may be arranged in front of the trim rising wall portion with respect to the vehicle and formed continuously with the trim general portion.

According to the above-described configuration, the trim main body includes the trim general portion and the trim rising wall portion, and the trim general portion forms the trim design surface. Furthermore, the trim rising wall portion is provided on an outer periphery of the trim general portion and formed so as to rise outward in the vehicle width direction. Consequently, the trim main body is formed so as to be bulging out toward the inner side of the vehicle compartment. In the meantime, when the passenger collides secondarily with the trim main body upon a side collision, the trim main body is deformed in a wide area. Due to the deformation of the trim main body, a tension is generated in the trim main body from the outer periphery (trim rising wall portion) of the trim main body to the trim main body inside (trim general portion).

Here, in the clip installation base, the clip settling portion juts out from the trim rising wall portion, and the clip rising wall portion that is continuous with the clip settling portion is arranged in front of the trim rising wall portion with respect to the vehicle and formed continuously with the trim general portion. Thus, the clip installation base is deformed and falls down forward with respect to the vehicle due to the tension generated from the trim rising wall portion in the trim main body toward the trim general portion. When the clip installation base is deformed and falls down, collision energy is absorbed thereby efficiently damping the collision reaction force that the passenger receives. Therefore, the invention has an excellent advantage that by using the tension generated in the trim main body, the clip installation base is deformed to absorb the impact energy.

The clip rising wall portion may include: a vertical wall portion that is extended inward in the vehicle width direction and forward with respect to the vehicle from an end of the clip settling portion; and an inclined portion that is connected to the vertical wall portion at the bent portion with the angle formed with respect to the vertical wall portion and extended from the bent portion inward in the vehicle width direction and forward with respect to the vehicle.

According to the above configuration, the clip rising wall portion includes the vertical wall portion and the inclined portion, and the bent portion is formed between the vertical wall portion and the inclined portion. The vertical wall portion is extended inward in the vehicle width direction and forward with respect to the vehicle from an end of the clip settling portion. Thus, the bent portion is located inward in the vehicle width direction and forward with respect to the vehicle relative to the clip settling portion. That is, the bent portion has no force application point and when the impact load is input to the clip installation base, a moment that is directed outward in the vehicle width direction occurs in the vertical wall portion around the end of the clip settling portion. In a consequence, the clip rising wall portion is deformed by buckling outward (forward) of the closed section portion. Thus, there is an excellent advantage that the buckling deformation mode can be stabilized.

The angle of the bent portion may be larger than 90° and smaller than 180°.

When the clip installation base is deformed and falls down as described above, collision energy is absorbed thereby effectively damping the collision reaction force that the passenger receives. Thus, according to the above-described configuration, the angle of the bent portion is set to be larger than 90° and smaller than 180°, so that the clip installation base is deformed easily following a tension generated toward the trim general portion from the trim rising wall portion of the trim main body. Therefore, there is an excellent advantage that the clip installation base is allowed to fall down using the tension generated in the trim main body.

What is claimed is:

1. A door trim for a side door of a vehicle having a vehicle compartment, the side door having an inner door panel that includes a mounting hole, the door trim comprising:

a trim main body formed so as to be bulging out toward an inner side of the vehicle compartment as an interior furnishing material of the door inner panel of the side door; and a clip installation base that is provided on the trim main body in a rear side area thereof with respect to the vehicle, the clip installation base including:

a clip settling portion that is configured to be opposed to the door inner panel, the clip settling portion to be fitted with a clip to be mounted in the mounting hole formed in the door inner panel; and a clip rising wall portion that is provided continuously with the clip settling portion, the clip rising wall portion forms a closed section portion together with the trim main body and the clip settling portion in a horizontal section in a state where the door trim is installed in the vehicle, the clip rising wall portion including a bent portion having an angle so as to be convex outward of the closed section portion.

2. The vehicle door trim according to claim 1, wherein the clip installation base is arranged on the trim main body in an upper side area thereof with respect to the vehicle.

3. The vehicle door trim according to claim 1, wherein the trim main body includes: a trim general portion that forms a trim design surface; and a trim rising wall portion that is provided on an outer periphery of the trim general portion and rises outward in a vehicle width direction, the clip settling portion juts out from the trim rising wall portion, and the clip rising wall portion is arranged in front of the trim rising wall portion with respect to the vehicle and formed continuously with the trim general portion.

4. The vehicle door trim according to claim 3, wherein a stepped portion formed so as to be waved along a vehicle longitudinal direction is provided at a connection portion between the trim general portion and the trim rising wall portion, and the stepped portion includes a sagging portion convex toward the inner side of the vehicle compartment.

5. The vehicle door trim according to claim 1, wherein the clip rising wall portion includes:

a vertical wall portion that is extended inward in a vehicle width direction and forward with respect to the vehicle from an end of the clip settling portion; and an inclined portion that is connected to the vertical wall portion at the bent portion with the angle formed with respect to the vertical wall portion and extended from the bent portion inward in the vehicle width direction and forward with respect to the vehicle.

6. The vehicle door trim according to claim 5, wherein an angle of the inclined portion relative to the clip settling portion is closer to 90° than that of the vertical wall portion.

7. The vehicle door trim according to claim 1, wherein the angle of the bent portion is larger than 90° and smaller than 180°.

8. The vehicle door trim according to claim 7, wherein the angle of the bent portion is larger than 120° and smaller than 170°.

9. The vehicle door trim according to claim 1, wherein upon application of an impact load to the clip installation base greater than a predetermined load, the clip rising wall portion is bent outward of the closed section portion at the bent portion.

* * * * *